March 10, 1942.  M. F. A. JULIEN  2,275,966

ANTIVIBRATION RESILIENT SUPPORT

Filed Jan. 11, 1939  2 Sheets-Sheet 1

M. F. A. Julien
Inventor

By Glascock Downing & Seebold
Attys.

Patented Mar. 10, 1942

2,275,966

UNITED STATES PATENT OFFICE 2,275,966

ANTIVIBRATION RESILIENT SUPPORT

Maurice François Alexandre Julien, Paris, France

Application January 11, 1939, Serial No. 250,451
In France October 31, 1938

5 Claims. (Cl. 248—358)

This invention relates to resilient supports and particularly to supports for delicate apparatus such as wireless installations mounted on mobile machines subjected to vibrations and has for its object to eliminate such vibrations as would be detrimental to said apparatus.

The accompanying drawings show various embodiments of the invention wherein—

Figure 1:
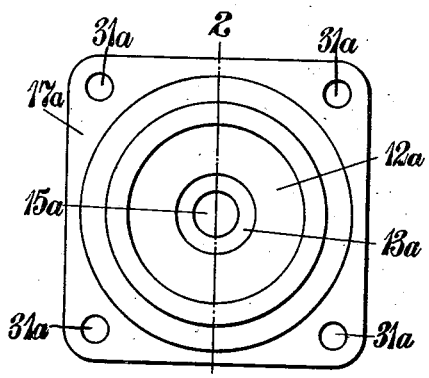
Figure 1 is a plan view of one half of a support.
Figure 2:
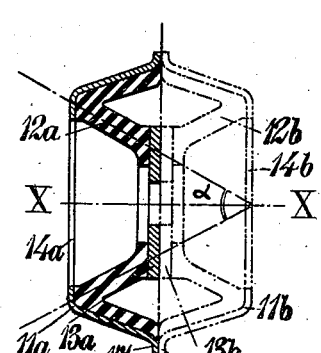
Figure 2 is a section along line 2—2 of a half support similar to that of Figure 1, the other half support being shown in mixed lines.

As shown in Figures 1 and 2 the resilient support comprises casings 11a and 11b formed with relatively large apertures 14a, 14b.

Resilient material 12a and 12b connect inner half frames 13a and 13b to the outer half casings 11a, 11b, and are made very thin in transverse section. They are inclined to the axis X—X of the inner frames of the support, so that they form truncated cone-shaped walls.

The thickness and conicity of the walls which may be regarded as important features of the invention have the effect of imparting to the supports a high elasticity in the direction of the axis X—X and of the same order of magnitude as their radial elasticity in the plane of the frames, i. e., at right-angles to the axis X—X. Thus the said supports are especially adapted for the suspension of delicate accessories on vehicles or in places which are subjected to intense vibrations in all directions.

The angle α at the apex of the conical generatrix of the resilient wall is preferably between 60° and 120°.

Figure 3:
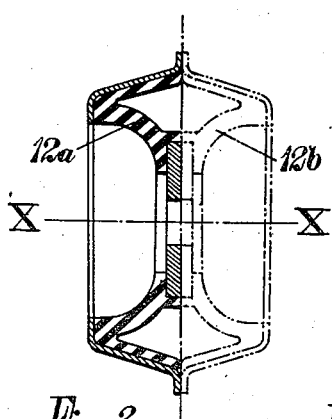
Figure 3 is a modification of the support shown in Figure 2.

Figure 3 shows in section a modification of the invention in which the axial elasticity along the axis X—X is obtained by giving the elastic walls or membranes 12a and 12b an inwardly curved section. Thus the truncated cone-shaped form shown in Figure 2 is replaced by a form similar to that of a spherical zone.

Figure 4:
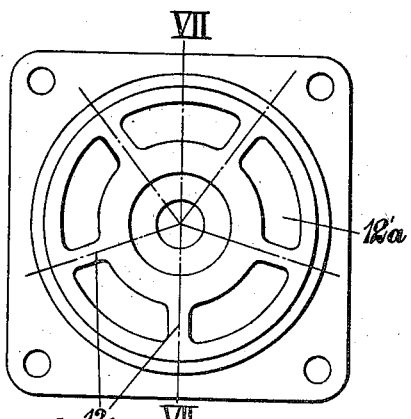
Figures 4 and 5 show other modifications of the invention.
Figure 5:
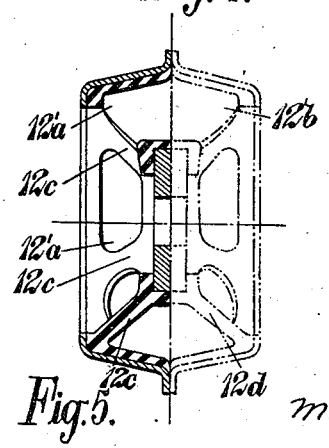

Figures 4 and 5 show another modification in which the walls or membranes of resilient material which connect the supporting frames resemble a wheel with several spokes 12c and 12d, similar to the shape described in British Patent Specification No. 494,811 of May 15, 1936, by the same inventor. This form is obtained by means of suitable openings 12'a, 12'b, which can be of different sizes and which are formed during the moulding, thus enabling a given elasticity to be obtained for the suspension.

Figure 6:
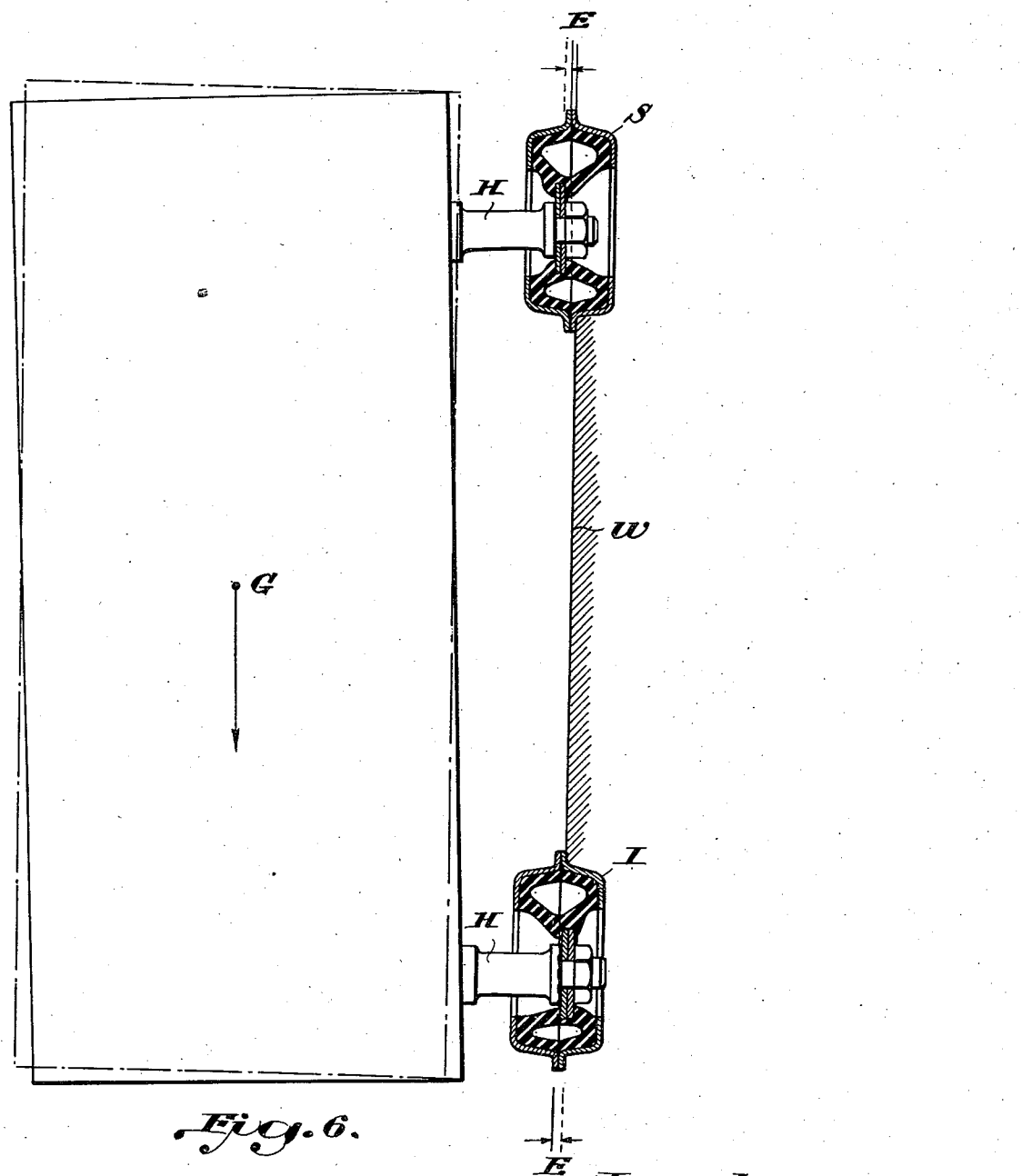
Figure 6 shows an example of the use of the resilent support according to the invention.

In the practical embodiment of the invention illustrated in Figure 6 two supports S and I are shown secured to a wall W and a member G is suspended therefrom by bolt means H. The tension and compression on the conical walls due to the weight of the supported member G is such that the oscillatory deformation E is the same for the supports S and I. Furthermore the displacement in directions perpendicular to the bolt means H is resisted by the resilient material up to a certain degree beyond which the further displacement is resisted progressively by the resilient lining adhering to the inner walls of the casings. This latter arrangement avoids all sudden shock as would obtain if metallic contact were made by the relatively movable parts of the support.

I claim:

1. A resilient support comprising an outer casing formed of two members each having an annular wall portion and meeting edges, disk-shaped frame members located within the casing and extending in planes parallel with said meeting edges, said frame members having peripheral portions, resilient means comprising a plurality of arms arranged in the form of a truncated cone extending outwardly from the region of said peripheral portions and connecting said frame members to said casing.

2. A resilient support comprising an outer casing formed of two members each having an annular wall portion and meeting edges, disk-shaped inner frame members extending in planes parallel with said meeting edges, said frame members having peripheral portions, thin walls of resilient material extending outwardly from the region of said peripheral portions and at an angle thereto and connecting said frame members to said casing, said inner frames being displaceable relatively to the outer casing and means limiting said relative displacement, said limiting means comprising resilient material extending on the inside of the annular wall portion.

3. A resilient support comprising a casing formed of two members each having an annular side wall and arranged with the edges of the side walls in abutting relation, frame members located wholly within the casing, spaced throughout their peripheries from the side walls, and extending in planes parallel with the edges of the casing members, and resilient material extending from and connecting the peripheral portion of each frame member to the casing, said resilient material being in the form of a hollow substantially truncated cone-shaped wall diverging outwardly from the frame member from which it extends and spaced exteriorly from the annular side walls of the casing.

4. A resilient support comprising a casing formed of two members each having an annular side wall and arranged with the edges of the side walls in abutting relation, frame members located wholly within the casing, spaced throughout their peripheries from the side walls and extending in planes parallel with the edges of the casing members, and resilient material extending from and connecting the peripheral portion of each frame member to the casing, said resilient material being in the form of a sector of a hollow sphere arranged so as to diverge outwardly from the frame member from which it extends and spaced exteriorly from the annular side walls of the casing.

5. A resilient support comprising a casing formed of two members each having an annular side wall and arranged with the edges of the side walls in abutting relation, frame members located wholly within the casing, spaced throughout their peripheries from the side walls and extending in planes parallel with the edges of the casing members, and resilient means extending from and connecting the peripheral portion of each frame member to the casing, said resilient means comprising a plurality of arms arranged in the form of a truncated cone diverging outwardly from the frame member and spaced exteriorly from the annular side walls of said casing.

MAURICE FRANÇOIS
ALEXANDRE JULIEN.